United States Patent [19]

Tremblay et al.

[11] 4,166,358

[45] Sep. 4, 1979

[54] SOLID STATE ALARM FOR CLOCK-RADIO

[75] Inventors: Dennis D. Tremblay, LaSalle; John Serafini, Peru, both of Ill.

[73] Assignee: General Time Corporation, Thomaston, Conn.

[21] Appl. No.: 781,407

[22] Filed: Mar. 25, 1977

[51] Int. Cl.[2] .......................... G04B 23/02; H04B 1/06

[52] U.S. Cl. .................................... 58/16 R; 325/396; 340/384 E; 58/38 R; 58/152 B

[58] Field of Search .................. 58/38 R, 38 A, 19 R, 58/21.11, 21.12, 152 R, 145 R, 16 R, 16 D, 152 B; 340/392, 393, 384 E; 325/396, 395, 389

[56] References Cited

U.S. PATENT DOCUMENTS

| | | | |
|---|---|---|---|
| 2,856,751 | 10/1958 | Preiser | 58/38 |
| 3,315,167 | 4/1967 | Goldwasser | 325/396 |
| 3,356,949 | 12/1967 | Jones | 325/396 |
| 3,681,916 | 8/1972 | Itoyama | 340/384 E |
| 3,825,836 | 7/1974 | Pyles | 325/396 |
| 3,900,798 | 8/1975 | Pomerantz | 325/396 |

*Primary Examiner*—J. V. Truhe
*Assistant Examiner*—William L. Feeney
*Attorney, Agent, or Firm*—Pennie & Edmonds

[57] ABSTRACT

A circuit provides a ramp voltage for purposes of controlling simultaneously a pair of transistors from saturation to cutoff and vice versa. Means are provided for generating an electronic strike and chime tone which is connected both to an amplifier circuit and the transistor controlled to cutoff. A tuner circuit which is part of the radio to provide a radio tone likewise is connected both to the amplifier and the transistor controlled to saturation. The circuit is provided with an enabling input at an alarm time and by dissipating the tones by varying percentages as the transistors change their state, a crescendo-decrescendo action may be obtained.

6 Claims, 2 Drawing Figures

SOLID STATE ALARM FOR CLOCK-RADIO

BACKGROUND OF THE INVENTION

The present invention relates to an improved audio alarm system capable of use in combination with a clock-radio for awakening the user at a preselected time.

Audio alarm systems of the general type herein are known and have been in use for some time, both in the United States and elsewhere. These systems are employed with a clock radio having capability of being set for automatic wake-up at which time a mechanism of the clock causes a switch, or the equivalent, to close thereby to close the circuit to the radio. The radio then commences operation. Usually such clock-radios have capability of providing, also, after a period of time during which the radio alone shall play the sounding of a buzzer-type device, which is conventionally activated and which continues until terminated by the user. Both the buzzer and the radio provide their alarm continuously at the same level of volume until they are one of the same, preferably the buzzer, controlled manually to an "off" condition.

The prior art also includes forms of electronic alarm clocks as represented by U.S. Pat. No. 3,681,916 to Itoyama et al. This particular device provides an alarm of continuous oscillatory or intermittent oscillatory sound which appears and disappears at a regular cycle. The sound, further, is capable of a crescendo action.

A further example of the prior art is that of U.S. Pat. No. 3,900,798 to Pomerantz et al. This patent describes a solid state alarm system which may be employed as a part of a clock radio. The system has capability of providing a crescendo of the alarm.

All of the prior art are considered to suffer from disadvantages because of sophistication and complication of circuitry, all resulting in an expensive consumer-type product in the marketplace. The present invention is directed to a rather simple circuit with far less complication and which results in a less expensive product. Further, the present device has a capability unique in the art of clock-radios whereby the radio volume after providing initial wake-up is caused to decrescendo as an alarm in the from of a strike and chime is caused to crescendo through a cross-fade out operation. Thus, the alarm provides the dominant sound until it shall be terminated, at which time the radio tone returns to the initial volume.

BRIEF DESCRIPTION OF THE INVENTION

The present invention is in an alarm circuit in combination with a clock-radio whereby after a period of time following initial operation of the radio the volume of the radio is caused to descrescendo to a barely audible level and an alarm in the form of a strike and chime is caused to crescendo to become and remain until controlled as the dominant sound.

The alarm system has capability of generating electronically the tone of a strike and chime which is repeatable with a decay. A circuit provides a ramp output to control a pair of transistors oppositely to cutoff and full saturation. The generating strike and chime signal and the radio signal from the tuner circuit of the radio are passed to an amplifier and in respective parallel circuits to one of the pair of transistors. Thus, a saturation of either transistor, the signals or a major portion will be dissipated to ground while at cutoff the major portion will be passed to the amplifier. If the transistors operate oppositely, the cross-crescendo-decrescendo operation will be achieved.

The present invention thus is an improvement over the prior art devices and also provides a unique function through its circuitry of a crescendo-decrescendo operation of radio tone volume and strike and chime volume.

A further and more particular discussion taken in conjunction with the drawing figures now follows.

DESCRIPTION OF THE PREFERRED EMBODIMENT

Figure 1:
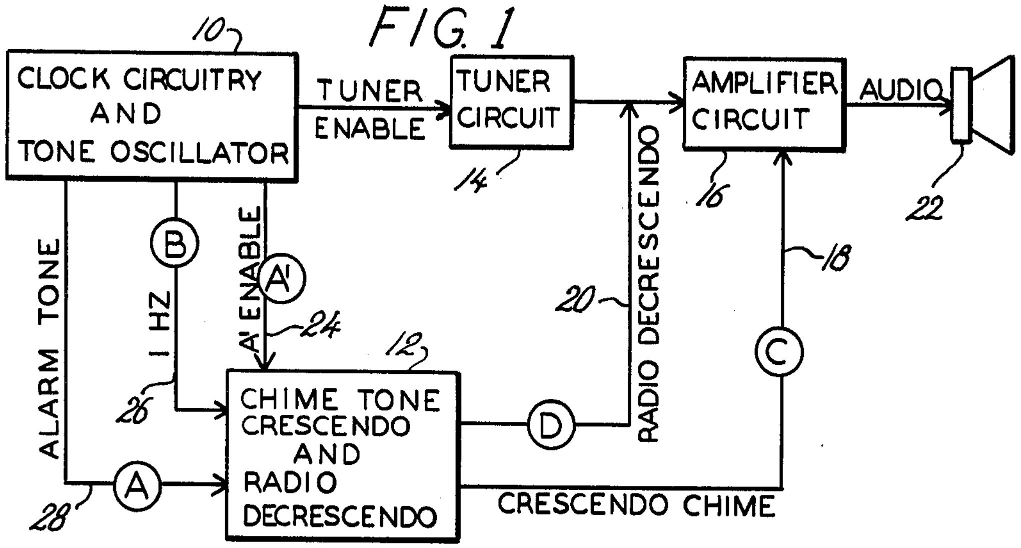
FIG. 1 is a block diagram of the circuit of a clock radio incorporating the electronic alarm circuit of the present invention; and, FIG. 2 is a schematic diagram of the electronic alarm circuit.

The block diagram of FIG. 1 generally illustrates the overall combination with a clock radio having capability of automatically turning "On" at a predetermined time of a circuit providing an electronic alarm in the form of a chime tone which, upon commencement after radio operation, crescendos to become the dominant sound while the radio tone decrescendos to a barely audible level of sound. Particularly, the radio may be preset to turn "On" at time T, the volume of the sound determined by a prior setting of a volume control, whereupon, for example, at time T+9 minutes the electronic alarm circuit which generates an intermittent chime tone will function and the intermittent chime tone beginning at a barely audible level of sound will crescendo as the radio tone substantially simultaneously begins to decrescendo from the set level of volume. If it is desired that there be a further sequencing of these events, a control may be provided to permit the person to drowse throughout a short period of time and then to be awakened for the second and subsequent time by the radio and thereafter the chime tone; or else the person merely may cause the chime tone to cease operation and rely upon the radio to maintain the condition of awareness. When the chime tone ceases operation, the radio tone will return to the precontrolled volume level.

Figure 2:
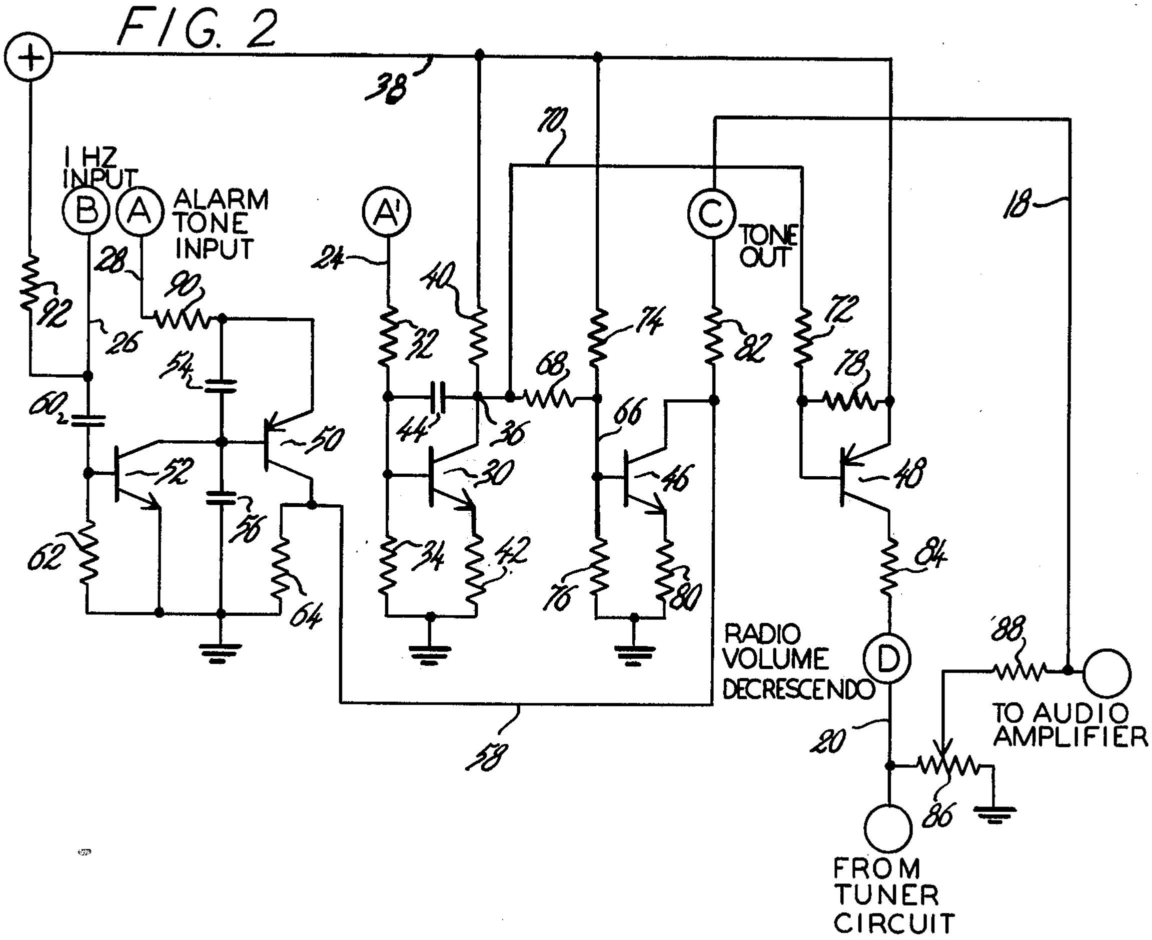

The system as illustrated in FIG. 1 comprises clock circuitry and a tone oscillator 10 providing a plurality of outputs for controlling the electronic alarm circuit 12 (hereinafter individually and collectively the "chime tone crescendo and radio tone descrescendo circuitry"), as will be more particularly described in make-up and function during a consideration of FIG. 2. A tuner circuit 14 controls the amplifier circuit 16. A pair of outputs 18 and 20 comprising the chime tone crescendo output and radio tone descrescendo output, respectively, modulate the amplifier circuit whose output is electrically connected to a speaker 22.

While the present invention is directed to the combination with a clock radio of electronic alarm circuitry to provide the programmed cross-fade capability of the radio tone and the chime tone when it shall have commenced operation, the particulars of the radio and both the clock and tone oscillator circuitry may be considered as conventional. Thus, the clock circuitry may comprise a digital clock circuit, identified as EA 5316 TAB, described in a bulletin of Electronic Arrays, Inc., Mountain View, California, dated March, 1977. The plural ouputs heretofore mentioned are generated by the integrated circuit and comprise, among others, an enabling signal along line 24, a 1 Hz signal along line 26 and an alarm tone signal along line 28. The alarm tone signal is the output of the tone oscillator (not shown) and comprises an alternating signal within the audible spectrum. The tone oscillator and the control transistor functioning as a ramp generator as will be discussed are controlled by the enabling signal which is a steady state positive input at point A'. The 1 Hz signal is in the form of a square wave which may derive from the circuit to the flashing colon of the digital display at point B and the alternating signal is found at point A. The indicia A, A' and B, as well as the indicia C and D representing the chime tone crescendo and radio tone descrescendo are common both to FIGS. 1 and 2 thereby to correlate one figure to the other.

The circuit of FIG. 2, providing the programmed cross-fade, i.e., to crescendo the chime tone and decrescendo the radio tone, now will be described. The transistor 30 controls the alarm circuit through the generation of a ramp signal, as will be discussed. The transistor normally is in the nonconducting or cutoff state and enabled to a conducting state by applying the signal of a steady state potential along line 24. To this end, the enabling signal provides a bias voltage at the base of the transistor as determined by the voltage divider comprising resistors 32 and 34 between the point A' and ground. The resistors regulate the input signal at the base connected therebetween and the transistor begins to conduct slowly thereby to create a situation that the voltage at the collector output, represented at point 36, begins to drop in potential. Initially, the voltage at point 36 will have been the voltage along bus 38 which may be 14 v DC. As the transistor 30 conducts, it generates by virtue of the resistors 32 and 34 as well as the resistors 40 and 42 and capacitor 44 a ramp signal which decreases in potential reaching a voltage of approximately 1 v DC. Capacitor 44 connected between point 36 and the base of transistor 30 couples the output to the base which has the effect of substantially linearizing the output and causing the ramp to decrease more slowly.

The output of transistor 30 controls the operation of each of transistors 46 and 48. The former transistor with its associated circuitry provides the crescendo to the chime tone, while the latter transistor with its associated circuitry provides the decrescendo to the radio tone.

The chime tone derives from the operation of transistors 50 and 52 and the circuitry with which they are associated. Particularly, the alarm tone signal at point A serves as a bias for the base of transistor 50 connected between a pair of series capacitors 54 and 56. The base ultimately will be biased to about the average voltage along line 28 and the transistor 50 will conduct as the signal slowly decreases. However, the transistor is rather quickly cutoff within approximately a second. The output of transistor 50 is connected to the collector or transistor 46 along line 58.

The 1 Hz signal input at point B is differentiated by the series capacitor 60 and resistor 62 thereby to provide a voltage spike at the base of transistor 52. Both of transistors 50 and 52 normally are in the nonconducting state and controlled to a conducting state by the alarm tone signal as well as the 1 Hz signal which resets transistor 50. Particularly, as the voltage on the base of transistor 50 slowly increases, the impedance across the emitter-collector decreases, causing the signal to be divided by the transistor and resistor 64 to lower the resulting amplitude. This has the effect of a decay in the signal along line 58. The transistor 52 operates to reset the condition where transistor 50 causes the amplitude of the signal to drop by pulling the voltage on the base of transistor 50 down. The transistor 52 normally is set such that the base is pulled low by resistor 62. When the positive spike pulse is impressed on the base, the transistor 52 will saturate and pull the collector voltage towards the emitter voltage. Thus, the transistors 50 and 52 form a chime strike circuit whose signal, as discussed, is passed to the collector of transistor 46.

Each of the resistors 62 and 64 and the emitter of transistor 52 are grounded. The capacitor 56, likewise, is grounded.

As indicated, the transistor 30 controls the operation of both of transistors 46 and 48, the former of which is normally in the conducting state; whereas, the latter of which is normally in the nonconducting state. The collector output at point 36 is connected to the base of transistor 46 by connector 66 through resistor 68, and also to the base of transistor 48 by connector 70 through resistor 72. These resistors together with resistors 74, 76 and 78, respectively, provide linearity of signal and adjust the voltage as necessary to properly bias the base of each transistor.

Turning to transistor 46, it will be appreciated that as the voltage at point 36 drops because of the conduction of transistor 30, the transistor 46 will conduct less and eventually cease conducting altogether. When the transistor is conducting and there shall be an output along connector 58 a sizable percentage of the signal shall be dissipated by resistor 80 between the emitter and ground. When the transistor 46 is fully conducting approximately 95 to about 99% of the signal along connector 58 may be lost. The signal not so dissipated is connected to the amplifier circuit 16 by resistor 82 along line 18. Thus, as the transistor 46 conducts less a smaller percentage of the signal will be so dissipated until such time as the entire signal is amplified at cut off of transistor 46. Accordingly, the chime strike tone created electronically although likened to a strike or attack of the hammer on a bell crescendos as the dominant sound. The operation of the transistor 46 from a conducting state to the state of cutoff follows that of transistor 30 from cutoff to the conducting state.

The operation of transistor 48 is somewhat similar. Thus, as the voltage at the collector of transistor 30 decreases, the voltage at the base of transistor 48 controlled by the divider network of resistors 72 and 78 likewise decreases. This has the effect of pulling the collector voltage up to the emitter and the transistor acts as a volume control to dissipate or squelch a major percentage of the signal from the tuner circuit 14 across resistor 84 to the positive bus 38. The amount of signal dissipated may be equal to although the reverse of the signal dissipation across resistor 80. The remainder of the signal is connected to the amplifier circuit 16 by a volume control potentiometer 86 and series resistor 88.

In a preferred embodiment, although without any intent to limit the invention, the following values for the described passive components may be employed.

| Component | Value |
|---|---|
| Resistor 32 | 220K |
| Resistor 34 | 27K |
| Resistor 40 | 22K |
| Resistor 42 | 47 ohms |
| Resistor 62 | 33K |
| Resistor 64 | 1K |

-continued

| Component | Value |
|---|---|
| Resistor 68 | 47K |
| Resistor 72 | 100K |
| Resistor 74 | 220K |
| Resistor 76 | 10K |
| Resistor 78 | 15K |
| Resistor 80 | 100 ohms |
| Resistor 82 | 68K |
| Resistor 84 | 100 ohms |
| Capacitor 44 | 10 $\mu f$ |
| Capacitor 54 | 0.1 $\mu f$ |
| Capacitor 56 | 0.1 $\mu f$ |
| Capacitor 60 | 0.1 $\mu f$ |

The transistors 30, 46 and 52 are NPN type transistors while the transistors 48 and 50 are PNP type transistors. The passive elements which have not been specifically referred to provide expected circuit functions, as for example, resistors 90 and 92 function as current limiting resistors and may have a value of 220K and 100K, respectively. The potentiometer 86 will be capable of varying from 0 ohms up to about 10K and the resistor 88 may be about 1K.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. The combination with a clock radio of an alarm circuit comprising
   (a) means for generating a ramp signal output,
   (b) a pair of impedance means each having an input connected to said output and adapted to be controlled oppositely to a condition that one impedance increases in value and substantially simultaneously the other impedance decreases in value,
   (c) a strike and chime generator having an intermittent output tone,
   (d) means providing a radio output tone,
   (e) means for amplifying said output tones,
   (f) individual circuit means connecting said output tones to a respective one of said impedance means and said amplifier means,
   (g) enabling means operable at a prescribed time to control said means generating said ramp signal output whereby the impedance means which increases in value dissipates less of said strike and chime output tone and said impedance means which decreases in value dissipates more of said radio output tone, and
   (h) means for discontinuing at least said strike and chime output tone so that said radio output tone, if not discontinued, will be dissipated to a lesser extent whereby said radio output tone will return in volume to its initial volume.

2. The combination of claim 1 wherein said means for generating said ramp signal output includes a transistor, the collector of said transistor connected to a voltage source, and the base of said transistor connected to said enabling means whereby when said enabling means is operable said transistor normally at cutoff conducts and the voltage at said collector comprising said ramp signal output drops in potential from the potential of said voltage source.

3. The combination of claim 2 including a capacitor connected across said collector and base of said transistor for both linearizing and causing said ramp signal output to slowly decrease in potential.

4. The combination of claim 2 wherein said impedance means includes a second and third transistor.

5. The combination of claim 4 wherein said second transistor is normally conductive and said third transistor is normally non-conductive, and both said second and third transistors are controlled to the opposite state by said ramp signal output.

6. The method of providing automatically over a period of time a wake-up alarm comprising
   (a) sounding a radio tone at a predetermined volume level, said radio tone comprising the dominant sound,
   (b) sounding an intermittent tone after passage of a period of time, said intermittent tone commencing at a low volume and gradually increasing to a higher volume,
   (c) substantially simultaneously with the sounding of said intermittent tone causing said radio tone to decrease to a barely audible volume level so that thereafter said intermittent tone comprises the dominant sound, and
   (d) discontinuing the sounding of at least said intermittent tone whereupon said radio tone, if not discontinued, will increase in volume from said barely audible volume level to become the dominant sound.

* * * * *